Nov. 5, 1963 J. S. STANULIS ETAL 3,109,627
CABLE BLOCK
Filed June 21, 1962
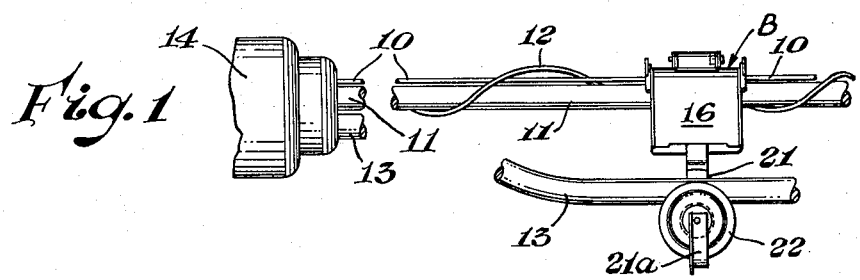
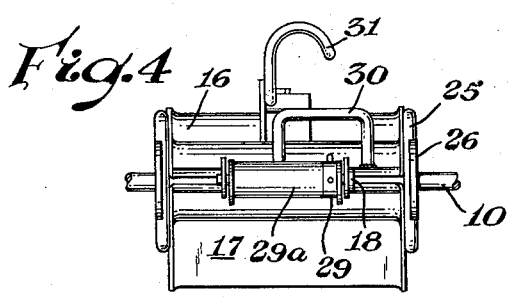
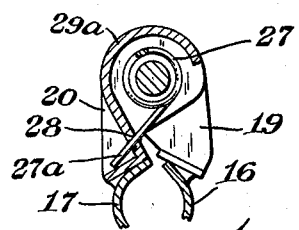
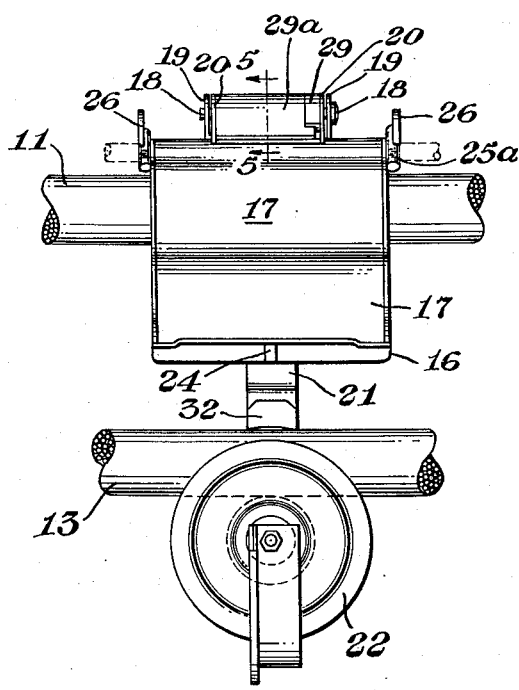
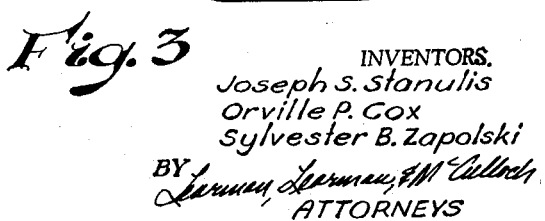
INVENTORS.
Joseph S. Stanulis
Orville P. Cox
Sylvester B. Zapolski
BY
ATTORNEYS

United States Patent Office 3,109,627
Patented Nov. 5, 1963

3,109,627
CABLE BLOCK
Joseph S. Stanulis, Orville P. Cox, and Sylvester B. Zapolski, Saginaw, Mich., assignors to General Welding Inc., Saginaw, Mich., a corporation of Michigan
Filed June 21, 1962, Ser. No. 204,201
9 Claims. (Cl. 254—134.3)

This invention relates to cable blocks for use in stringing cables or lines, such as telephone lines, between poles or towers to support the line being strung at points intermediate the poles or towers until it can be lashed in position. Whether the telephone lines are lead coated cables or the newer polyethylene coated cables, they are relatively heavy and it is necessary to temporarily hold the heavy cable up close to the wire to which it is to be lashed until it can be permanently lashed or affixed thereto. Generally speaking, the so-called cable or pulley blocks are attached at intervals between the poles or towers on the messenger wire and then a rope is strung through the blocks and used to pull the heavy cable over the pulleys of the blocks so that it is supported in a suitable position adjacent the messenger wire. Recently we have determined that a second telephone cable can be lashed to the messenger wire and a first telephone cable and supported in place, with a consequent great saving in the obviation of erecting new poles or towers and we have designed a pulley block which makes this practice feasible.

One of the prime objects of the present invention is to design a pulley block suitable for use to support a second telephone cable in juxtaposition to a messenger wire having a first telephone cable already lashed thereto.

Another object of the invention is to provide a cable block of the character described which is automatically released by the lashing machine in the sense that, once engaged by the lashing machine, it releases from its clamped position on the messenger wire and first cable and can be readily slid along them as the lashing proceeds, or can be easily removed if desired.

Another object of the invention is to provide a pulley block of the clamp-on variety which is not difficult to operate from the ground and can be rapidly placed in clamped position and removed therefrom.

A further object of the invention is to provide a cable block incorporating safety elements which prevent its inadvertent displacement from the line to which it is clamped except when it is released from the line by manual manipulation of a pole hook.

Another object of the invention is to provide a block of the character described which can be readily formed of pressed metal so that there is considerably less breakage than is the case with blocks formed of cast iron.

Still a further object of the invention is to provide a cable block of the character described which can be economically manufactured and assembled.

Other objects and advantages of the invention will be pointed out specifically or will become apparent from the following description when it is considered in conjunction with the appended claims and the accompanying drawings, in which:

FIGURE 1 is a side elevational view showing a cable block clamped in position on a lashed messenger wire and first cable and supporting a second cable in position ahead of a cable lashing machine;

FIGURE 2 is a considerably enlarged, similar view of the cable block;

FIGURE 3 is an end elevational view on the same scale as FIGURE 2;

FIGURE 4 is a top plan view; and

FIGURE 5 is an enlarged, transverse sectional view taken on the line 5—5 of FIGURE 2.

Referring now more particularly to the accompanying drawing, in which a preferred embodiment of the invention only has been depicted, a numeral 10 indicates the steel supporting cable or messenger wire which is strung and supported between poles or towers, and the numeral 11 a first telephone cable which has been lashed to it by the lashing wire 12. As indicated in FIGURE 1, a second telephone cable 13 is to be lashed to the cables 10 and 11 with additional lashing wire in any suitable manner and partly shown is a cable lashing machine 14 of the character shown in Patent No. 2,272,253, granted February 10, 1942, to E. St. John. In practice, the cable lashing machine employed could be of the same design except that the through opening for passing the messenger wire or cable 10 would have to be enlarged sufficiently to pass the lashed cables 10 and 11.

Shown clamped in position in FIGURE 1 is the cable block B of the present invention, which, as shown particularly in FIGURES 2 and 3, comprises a hanger member generally designated 15 which includes a fixed clamp plate 16 having an overhanging lip clamp plate 17 hingedly connected thereto by a pin 18. It will be seen that pin 18 is supported by ears 19 fixed to the hanger plate 16 and the lip 17 has upstanding bearing members 20 with openings through which the pin 18 extends, the bearings 20 being freely pivotal on pin 18 which is fixed to ears 19. Dependent from the hanger member plate 16 is a pulley support leg portion or bar 21 having an upturned terminal end 21a as shown. The pulley 22 which supports telephone cable 13 is rotatably supported between the end 21a and opposite portion of the hanger bar 21 on a pin 23.

The hanger clamp plate 16 and the cooperating hinged lip clamp plate 17 are provided with opposed recessed areas 16a and 17a, respectively (FIGURE 3), which together form a socket, spaced somewhat below the hinge pin 18, adapted to accommodate the messenger wire 10. In addition, the plates 16 and 17 are bulged outwardly, as at 16b and 17b, respectively, to form an enlarged socket communicating with the socket previously mentioned which can accommodate the cable 11. A spaced distance below the socket portions 16b and 17b is a positive safety lock rod 24 fixed to plate 16 which curves upwardly and outwardly toward the hanger lip 17. When the cable block is not in use, the lip 17 engages the end of the rod 24 and there is a slight communicating space between the sockets formed by the portions 16a, 17a and 16b, 17b.

Mounted fast to the sides of clamp plate 16 are hook members 25 with overhanging terminal end portions 25a. These safety hooks, which tend to maintain the cable block in position, particularly at a time when the cable 11 is no longer clamped in the socket formed by portions 16b, 17b, mount bunt blocks 26 on their upper edges, as shown, which are substantially flush with the outer portions of the hook members 25. The blocks 26 function as vertical extensions of the hook members 25.

Provided to tend to urge the hanger lip 17 toward the hanger member 15 is spring means comprising, in the embodiment shown, a torsion spring 27 having one terminal end 27a extending through an opening 28 in a curvilinear guard sleeve 29a which is welded to the hanger lip 17 and substantially envelops spring 27, and an opposite end fixed by a ring 29 which mounts fast relative to stationary pin 18. While a torsion spring of the screen door variety has been shown biased to urge the lip 17 downwardly to clamped relation, plainly leaf type spring means or other suitable spring means could be employed.

Mounted on the hanger plate 16 to laterally project at an angle slightly upwardly inclined from the horizontal is a ring 30 which is used to pull the cable block down to anchored position, and also provided, outwardly projecting at a slightly upward angle to the horizontal, is a laterally extending hook 31 which has a function to be presently explained. Generally speaking, the cable blocks are placed in position from the ground with the aid of a pike or pole hook which has an upwardly facing fork at its upper end and a downwardly facing hook spaced a slight distance below the upper forked end, the upper forked end is inserted through the ring portion 30 with the pole extending through the hook 31 which acts as a stabilizing guide, and the cable block is raised until the rod 24 rests on the lashed messenger wire 10 and first cable 11. Since rod 24 is curved upwardly, if the hook on the pike is hooked over the ring or eye 30 and the cable block is pulled downwardly, the lip 17 will be raised and the messenger wire 10 will find its way into the socket formed by portions 16a, 17a and the cable 11 into the enlarged socket formed by sections 16b, 17b. For this reason, the lip 17 must extend substantially below the free terminal end of the rod 24.

In this position the cable block is tightly clamped in position and the line 13 to be strung can be passed over the pulley 22. When the cable lashing machine 14 reaches the cable block B it engages the member 25 and bunt block 26 on one side of the block B and tends to push the block B longitudinally down the lashed wire lines 10 and 11. What occurs is that the clamp plates 16, 17 of the block tend to follow the lashing wire spiral upwardly so that the messenger wire 10 in effect descends to the socket formed by portions 16b, 17b and the first cable 11 descends below the socket formed by portions 16b, 17b, the lip 17 being forced open sufficiently to permit this to occur. Generally speaking, the lashing wire, which is about .065" to .080" in diameter, is lashed with a space of about a foot between complete spiral revolutions.

Of course, once the lashing machine reaches the cable block B, the block's support function is no longer required and the block B is free to slide longitudinally or to be removed. The block B can easily be removed from the ground if the fork end of the pike is inserted through the ring 30 and pulled in a direction laterally away from the axes of the lines 10 and 11, lip 17, of course, being raised to permit this to occur and the cable block being lifted slightly at the same time. To prevent the lashing wire 12 from getting caught between the end wall of pulley 22 and the hanger leg 21, a block 32 is welded to the leg 21 just above the pulley 22 as a guard. Also, the plates 16 and 17 are beaded, as at 33, to provide friction beads, as shown.

The safety hooks 25 prevent the cable block from being brought to the ground when it is overweighted, since sometimes line stringers will use too few cable block between a given set of poles for the weight of cable they are stringing. It is a very desirable attribute of the present cable block that it is automatically unlocked when engaged by the cable lashing machine, and therefore can simply be pushed to the adjacent pole. Cable blocks of other design which have been proposed require that ladders be used intermediate the poles to remove them and sometimes this is dangerous or even impossible, dependent on the terrain. The hooks 25 function to prevent the cable block from jumping off the lashed wires 10 and 11, even though the bunting blocks are engaged by the cable lashing machine with considerable force.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

We claim:

1. In a pulley block for stringing an additional telephone cable along a messenger wire to which a telephone cable is lashed; a hanger member having an overhanging lip hinged thereto adapted to hook over the messenger wire and cable; said lip and adjacent portion of the hanger being shaped to form a pair of upper and lower bulged sockets with the upper socket of decreased size; said hanger having a downward extension below said lip; a pulley shaped to receive said additional cable mounted on said downward extension with its axis of rotation transverse thereto; and spring means biasing said lip toward said hanger member.

2. The combination defined in claim 1 in which hook means is fixed to said hanger member to extend therefrom in the manner of said lip, adjacent said lip, and to also hook over the messenger wire and cable.

3. The combination defined in claim 2 in which said hook means comprises a hook fixed to each side of the hanger member and said hooks have upstanding bunt blocks thereon.

4. The combination defined in claim 1 in which a cross member extending angularly upwardly from said hanger member toward said lip is fixed at a spaced distance below said sockets.

5. The combination defined in claim 4 in which said cross member curves upwardly and outwardly from said hanger member.

6. The combination defined in claim 1 in which a projecting hook having a curvilinear portion extending crosswise of said hanger is fixed thereon.

7. The combination defined in claim 6 in which a projecting ring is fixed to said hanger above said hook.

8. In a cable block for stringing an additional telephone cable along a messenger wire to which a telephone cable is lashed; a hanger member having an overhanging lip hinged thereto adapted to hook over the messenger wire and cable; said lip and adjacent portion of the hanger being shaped to form a pair of upper and lower bulged sockets with the upper socket of decreased size; said hanger having a downward extension below said lip; a support member adapted to accommodate said additional cable mounted on said downward extension with its axis transverse thereto; and spring means biasing said lip toward said hanger member.

9. The combination defined in claim 8 in which a cross member extending from said hanger member toward said lip is fixed at a spaced distance below said sockets.

References Cited in the file of this patent

UNITED STATES PATENTS

| | | |
|---|---|---|
| 856,335 | Callahan | June 11, 1907 |
| 2,566,233 | Makie | Aug. 28, 1951 |
| 2,980,401 | Witmor | Apr. 18, 1961 |